United States Patent [19]

Huver et al.

[11] Patent Number: 5,268,436
[45] Date of Patent: Dec. 7, 1993

[54] RADICALLY POLYMERIZABLE MULTI-COMPONENT MIXTURES AND THEIR USE (I)

[75] Inventors: Thomas Huver; Herbert Fischer, both of Duesseldorf; Winfried Emmerling, Erkrath, all of Fed. Rep. of Germany

[73] Assignee: Henkel Kommanditgesellschaft auf Aktien, Duesseldorf, Fed. Rep. of Germany

[21] Appl. No.: 654,630
[22] PCT Filed: Aug. 22, 1989
[86] PCT No.: PCT/EP89/00982
§ 371 Date: Feb. 27, 1991
§ 102(e) Date: Feb. 27, 1991
[87] PCT Pub. No.: WO90/02143
PCT Pub. Date: Mar. 8, 1990

[30] Foreign Application Priority Data
Aug. 31, 1988 [DE] Fed. Rep. of Germany ....... 3829438

[51] Int. Cl.$^5$ ............................ C09J 5/04; C09J 4/02; C09J 11/04; C09J 11/06
[52] U.S. Cl. .................................. 526/216; 156/327; 526/90; 526/91; 526/115; 526/126; 526/131; 526/178; 526/192; 526/194; 526/195; 526/217; 526/317.1; 526/341; 526/346
[58] Field of Search .................. 526/216, 236, 217, 91; 156/327

[56] References Cited

U.S. PATENT DOCUMENTS 4,126,504 11/1978 Wolinski .......................... 525/112

FOREIGN PATENT DOCUMENTS 871424 6/1961 United Kingdom .

OTHER PUBLICATIONS

L. Horner et al., Makromolekulare Chemie, 93 (1966) 69–108
C. R. Noller, "Textbook of Organic Chemistry", 2nd Ed., 125 (1958) Saunders (Philadelphia).

Primary Examiner—Joseph L. Schofer
Assistant Examiner—Fred Zitomer
Attorney, Agent, or Firm—Ernest G. Szoke; Wayne C. Jaeschke; Norvell E. Wisdom, Jr.

[57] ABSTRACT

The invention relates to moldable, radically polymerizable multicomponent mixtures containing
ethylenically unsaturated, polymerizable compounds, if desired in admixture with soluble and/or insoluble fillers and
an activator system initiatable by contact with oxygen,
and is characterized in that these multicomponent mixtures contain an activator system based on the following principal components which can be initiated by contact with oxygen and water and, in particular, by contact with ambient air:
N-alkyl-substituted tert-arylamines containing at least one aliphatic CH bond in the $\alpha$-position
metal compounds at least partly soluble in the system to accelerate the drying of unsaturated oils and
compounds of weakly acidic carboxylic acids having $pK_a$ values of no less than about 0.9 which can be hydrolyzed to the free carboxylic acid on contact with moisture.

The invention also relates to the use of these multicomponent mixtures as an aerobic adhesive system, more particularly in the form of a one-component adhesive packed in storable form, and to their use for surface coating or for the production of plastic moldings.

20 Claims, No Drawings

RADICALLY POLYMERIZABLE MULTI-COMPONENT MIXTURES AND THEIR USE (I)

BACKGROUND OF THE INVENTION

1. Field of the Invention

This invention relates to new moldable, radically polymerizable multicomponent mixtures which are used, for example, as free-flowing or spreadable compositions or as pastes and then hardened under ambient conditions through initiation of the polymerization reaction. In applicational terms, the invention relates in this regard to almost any field where radically polymerizable or curable compositions are used, including for example adhesives, sealing compounds, the specific production of plastics moldings, surface coating with air-hardening and, in particular, solventless paint systems and the like.

2. Statement of Related Art

The peroxide- or hydroperoxide-initiated hardening of olefinically unsaturated systems requires activator systems made up of several components, particularly when the reaction is to be initiated at low temperatures, for example at room temperature or only slightly elevated temperature. It is known that selected tertiary amine compounds partly aromatically substituted at the nitrogen atom perform such an activating function. Known activators for the initiation of polymerization reactions by benzoyl peroxide, for example, are in particular dimethyl aniline and dimethyl-p-toluidine.

A totally different known class of activators for oxidative initiation of the polymerization of certain unsaturated systems, namely drying oils, are metal compounds—at least partly soluble in the system—of metals which can occur in several valency stages and accelerate the initiating reaction through intermediate shifts in valency on interaction with other components of the system. Metal compounds such as these—sufficiently soluble in organic solvents and/or in binders—of metals of the type in question have long been known as so-called driers for the air drying of paints, varnishes and the like based on unsaturated oils. Sufficiently oil-soluble compounds of transition metals, which are capable of occurring in several valency stages, are particularly suitable for this purpose. The individual components differ in their ability to accelerate hardening, compounds of cobalt and/or manganese being particularly suitable, although iron also accelerates hardening. In addition to and, in particular, in combination with these highly active metallic components, it is possible to use comparable compounds of other metals which may also be capable of forming several valency stages. A detailed description of such systems can be found, for example, in Ullmann, *Encyklopadie der technischen Chemie* {English title: Encyclopedia of Technical Chemistry}, 4th Edition, Vol. 23 (1983), 421–424.

It is also known that the two types of promoters described here for the radical initiation of polymerization can lead by interaction to an enhanced effect. For example, the article by L. Horner et al. "Autoxidationsstudien an N,N-dialkylierten Anilinderivaten" {English title: Autoxidation Studies on N,N-Dialkylated Aniline Derivatives", in *Makromolekulare Chemie* 93 (1966), 69 to 108, relates to investigations into the acceleration of the spontaneous autoxidation of N-dialkyl-substituted arylamine compounds in pure, highly dry oxygen gas. In the first stage of the spontaneous autoxidation, the amine hydroperoxide compound is formed at aliphatic CH groups in the $\alpha$-position under the effect of dried, superpure oxygen. This spontaneous autoxidation of the N,N-dialkylated arylamines takes place very slowly. According to the article in question, the co-use of cobalt (II) compounds and, to a lesser extent, the co-use of iron (III) salts results in activation of the autoxidation process. In further studies reported in this article, it is shown that acetic acid also has a pronounced accelerating effect on autoxidation at the tertiary amine compound whereas stronger acids, such as trichloroacetic acid, or mineral acids form true tertiary ammonium salts which are not autoxidizable. The use of cobalt ions in conjunction with acetic acid leads to the vigorously catalyzed autoxidation of dialkyl aniline compounds under the effect of superpure oxygen.

Finally, the article cited above describes studies into the initiation of the polymerization of vinyl compounds by the dimethyl aniline/superpure oxygen/cobalt salt system. High-purity acrylonitrile, methyl methacrylate, ethyl acrylate and styrene can be polymerized with this system. The initiating reaction is interpreted as redox catalysis in which molecular oxygen acts as oxidizing agent. There are no references in the publication in question to the suitability of the multicomponent systems investigated for practical use in the polymerization field. In fact, however, these theoretical works, which have been available to those skilled in the art for almost 25 years, have not provided any encouragement for their practical application.

DESCRIPTION OF THE INVENTION

The problem addressed by the present invention is to utilize existing knowledge of multicomponent redox systems as described above in providing a new class of activator systems which may be used in a new and simplified way for initiating the polymerization of olefinically unsaturated systems. The new activator systems are intended to lead in the absence of oxygen and water to non-reactive mixtures which do not polymerize in admixture with the olefinically unsaturated, polymerizable components and are therefore stable in storage both in the form of one-component systems and also in the form of multicomponent systems. On the other hand, the new activator systems are intended to be able to be activated by the action of water and oxygen. In preferred embodiments, this activation is intended to take place even at room temperature, although a moderate increase in temperature may be necessary. A particularly important aspect of the invention relates to multicomponent systems of the above-mentioned type which, by virtue of the moisture and oxygen always present in ambient air, are capable of initiating the starting reaction of a radical polymerization of unsaturated systems at room temperature or only moderately elevated temperatures simply by contact with ambient air.

In a first embodiment, therefore, the present invention relates to moldable, radically polymerizable multicomponent mixtures containing ethylenically unsaturated, polymerizable compounds, if desired in admixture with soluble and/or insoluble fillers and an activator system initiatable by contact with oxygen, characterized in that these multicomponent mixtures contain an activator system based on the following principal components which can be initiated by contact with oxygen and water and, in particular, by contact with ambient air:

N-alkyl-substituted tert-arylamines containing at least one aliphatic CH bond in the α-position metal compounds at least partly soluble in the system to accelerate the drying of unsaturated oils and compounds of weakly acidic carboxylic acids having $pK_a$ values of no less than about 0.9 which can be hydrolyzed to the free carboxylic acid on contact with moisture.

Accordingly, the essence of the teaching according to the invention lies in the choice of the specific activator system which is being described for the first time in this combination. This system differs from the activator systems described by L. Horner et al in particular in the choice of the third component described. According to the invention, the free carboxylic acid is not present as such, as in the case of the acetic acid investigated by Horner, but instead in the form o carboxylic acid derivatives which, as such, do not contain any free carboxyl groups, but can be hydrolyzed to the free carboxylic acid on contact with moisture. Accordingly, the simplifications and extended applications thus created in practice immediately become clear.

The state of activation required for the initiation of polymerization in the context of the invention requires the cooperation of the aromatic amine and the metal compound at least partly soluble in the system with the free carboxylic acid. However, because the free carboxylic acid is not introduced as such, but instead in masked form, an additional degree of freedom is created in regard to inhibition of the system as a whole. It is known that the complete absence of oxygen or rather the corresponding elimination of oxygen from multicomponent mixtures cannot be reasonably achieved in practice. Starter systems which convert molecular oxygen into a reaction-initiating intermediate stage—or polymerizable mixtures containing such starter systems—are always comparatively jeopardized by unwanted secondary reactions. The possibility which the invention affords of additionally inhibiting the system by the absence of moisture increases safety during the production, handling, storage and use of the air-sensitive systems. The freedom created in this regard can be further increased by suitable auxiliary measures described in the following. In particular, it is also possible in this way to produce and store the polymerizable compounds as a non-reactive one-component mixture. Mere contact with air at ambient temperature or at most moderately elevated temperatures is sufficient to activate the starter system and, hence, to initiate the reaction in the system as a whole for dimensionally stable hardening. The open time of the system required for molding may be varied within wide limits through further measures proposed in accordance with the invention, as described hereinafter. Practical significance is thus attributed to multicomponent systems having the composition according to the invention in the broadest applicational sense.

The three components of the activator system used in accordance with the invention will first be described in detail in the following:

N-alkyl-substituted tert-arylamines

All corresponding compounds containing at least one aliphatic CH bond in the α-position are suitable. The amine components used in accordance with the invention correspond in particular to general formula I:

in which $R_1$ is an optionally substituted aryl radical, $R_2$ has the same meaning as $R_1$ or may also be an optionally substituted alkyl radical. This alkyl radical may be linear or branched. $R_3$ is a linear or branched alkyl radical which may also be substituted and which may be the same as or different from the alkyl radical optionally present in $R_2$, but is always distinguished by the fact that at least one H atom is present in the α-position to the N.

The preferred aryl radical is the phenyl radical which may also be substituted, more especially alkyl-substituted. The alkyl radicals present in $R_3$ and optionally $R_2$ each preferably contain up to about 10 carbon atoms and, in particular, up to about 6 carbon atoms. Particular significance is attributed to corresponding $C_{1-3}$ radicals and again to the methyl radical in particular. In one preferred embodiment, the radicals $R_2$ and $R_3$ are corresponding, optionally substituted, alkyl radicals while the radical $R_1$ is an optionally substituted phenyl radical, so that N,N-dialkyl-substituted aniline compounds, which may also be alkylated in the phenyl ring, are generally preferred. The most important components in the context of the invention are dimethyl aniline and, in particular, dimethyl-p-toluidine.

Basically, the principles stated by L. Horner et al, loc. cit., apply to the activity and the activatability of these tertiary amine compounds: nucleus substituents influence the autoxidation rate of the dimethyl aniline. Electron donors increase the autoxidizability of the amine, electrophilic substituents reduce it. Accordingly, p-toluidine compounds are more reactive than the otherwise structurally identical aniline derivatives. The general principles stated by Horner also apply with regard to the alkyl substituents in $R_3$ and $R_2$. The methyl group is much more accessible to oxidation than all other N-alkyl substituents. Basically, the known results of the action of dibenzoyl peroxide on tertiary amines, as reported in the cited literature reference, also apply here.

Metal compounds at least partly soluble in the system

As already mentioned, the most important driers of the type in question are distinguished by the fact that, above all, metal compounds of metal capable of occurring in several valency stages are used. Selected representatives of the transition metals can be particularly active in this regard. The particular choice of the metal may have inter alia a velocity-determining effect on the initiation of polymerization on account of a certain dependence on temperature of the reactive intervention of this metal component in the process as a whole. Components which are highly active at room temperature are derived in particular from cobalt and/or manganese. Iron also has a certain, albeit weaker, effect in accelerating the reaction at room temperature. The activity of other metal components, for example those based on vanadium, can be increased by increasing the temperature to such an extent that the polymerization reaction can be rapidly initiated.

Cobalt and/or manganese compounds, optionally in admixture with other metallic components, such as compounds of lead, cerium, calcium, barium, zinc, and- /or zirconium, are particularly suitable for working at room temperature which is of particular advantage for numerous applications. Reference is made in this regard to the relevant specialist literature, cf. for example the cited publication in Ullmann, loc. cit. and the literature cited therein.

The metals in question here are used in the form of such compounds that they are at least partly soluble in the system as a whole. Both soap-like metal compounds and also types attached otherwise, particularly in complex form, to organic radicals are suitable. A typical example of working in accordance with the teaching of the invention is the use of corresponding metal naphthenates or metal acetyl acetonates. Providing inorganic salts are sufficiently soluble in the system, it is also possible to use such inorganic systems. A typical example is iron chloride which has a distinctly accelerating effect when used in the system according to the invention.

It may be advisable to use the metal compounds in a low valency stage of the metal, i.e. for example as cobalt (II) or manganese (II). In other cases, it is also suitable to use the metal compound in the higher valency stage of the metal. Thus, iron chloride, for example, is preferably used in the form of the $Fe^{3+}$ salt For testing whether a particular metal compound is suitable for initiating polymerization according to this invention, it may be incorporated, to the extent of 0.01 parts by weight of metal compound, into the following mixture:

40 parts by weight of toluene,
10 parts by weight of triethylene glycol dimethacrylate,
2 parts by weight of methacrylic acid, and
2 parts by weight of N,N-dimethyl-4-toluidine.

If the metal compound to be tested is not soluble in this mixture, it can be introduced after being dissolved in a suitable solvent. If the metal compound is active enough for use in this invention, sufficient cross linking polymerization should take place within two hours after introducing the metal compound into this mixture to gel the mixture.

Masked carboxylic acid compounds hydrolyzable on contact with moisture

A factor of crucial importance in the selection of these components is the acidity of the free carboxylic acid. The $pK_a$ value of the free acid should be no lower than about 0.9, the preferred limit being at about 1.

If much more strongly acidic components are used, acceleration of the reaction comes to a stop. This is illustrated by the following examples. The $pK_a$ value of trichloroacetic acid is approximately 0.6. The addition of trichloroacetic acid in masked or unmasked form to the system destroys the ability of the multicomponent initiator system used in accordance with the invention to initiate polymerization reactions. By contrast, dichloroacetic acid is a relatively weak carboxylic acid with a $pK_a$ value of approximately 1.3. This dichloroacetic acid is eminently suitable for initiating polymerization reactions in accordance with the invention. Strongly acidic mineral acids, for example hydrochloric acid, also affect the ability of the activator systems used in accordance with the invention to initiate polymerization reactions. Acetic acid or derivatives hydrolyzable to acetic acid ($pK_a$ value of acetic acid about 4.76) are eminently suitable for accelerated reaction initiation.

The upper limit to the $pK_a$ value may be seen in the region of very weakly acidic compounds—determined as free carboxylic acid. In numerical terms, therefore, the upper limit is at $pK_a$ values of approximately 13 and, preferably, at $pK_a$ values of approximately 11.5. However, carboxylic acids which have $pK_a$ values in the hydrolyzed state of up to about 8 and preferably of up to about 6 or 7 are particularly suitable. Particularly effective components of the type in question here are thus derived from carboxylic acids which have $pK_a$ values in the hydrolyzed state in the range from about 1 to 6 or 7.

The carboxylic acids to be used in masked form in accordance with the invention may contain one or more carboxyl groups. The constitution of the acid as such is not such a crucial parameter given the correct $pK_a$ value. So far as the practical application of the invention is concerned, the reliable availability of the fully masked form of the particular carboxylic acid is the prime consideration. In the preferred embodiment of the invention, steps are taken to ensure that no free carboxyl groups are present in the starting mixture, but are only formed during processing by hydrolytic elimination of the masking part of the molecule. In preparative terms, therefore, it can be of advantage for the component in question here to be based on carboxylic acids containing 1 to 4 carboxyl groups and, in particular, 1 or 2 carboxyl groups. It may be particularly simple to use masked monocarboxylic acids because the need to eliminate free carboxyl groups can be satisfied particularly easily in their case. The choice of the particular carboxylic acid is also largely determined by corresponding expediency considerations. Readily obtainable carboxylic acids, such as lower aliphatic carboxylic acids or corresponding aromatic mono- or polybasic carboxylic acids are suitable components. Suitable aliphatic carboxylic acids are $C_{1-18}$ and preferably $C_{1-10}$ monocarboxylic acids, acetic acid again being particularly important. Suitable aromatic carboxylic acids are benzoic acid or corresponding polycarboxylic acids, for example trimellitic or pyromellitic acid. As shown with reference to the example of dichloroacetic acid, substituted acids of this type are also suitable providing their $pK_a$ value is within the stated limits. It is crucial to the teaching according to the invention that these weak carboxylic acids be used in the form of their hydrolysis-labile derivatives. Particularly suitable derivatives are corresponding derivatives of weakly acidic carboxylic acids corresponding to general formula II $$X-O-CO-R_4 \qquad (II)$$

in which $R_4$ is an optionally substituted alkyl, cycloalkyl or aryl radical and X is a weakly acidic, substantially neutral or, in the extreme case, very weakly basic radical removable by hydrolysis at most slightly elevated temperatures with simultaneous formation of the free acid $R_4COOH$. This limitation in the definition of the radical X ensures that the weak acid $R_4COOH$ can actually perform the reaction-initiating function assigned to it. Suitable hydrolysis-labile derivatives of the weak carboxylic acids are, for example, their anhydrides or their mixed anhydrides with other weak carboxylic acids, these other weak carboxylic acids in particular also meeting the requirements stated above in regard to the $pK_a$ limit. Particularly suitable derivatives of the type in question are mixed anhydrides or esters of the weak carboxylic acids used in accordance with the invention with hydroxy compounds of hetero atoms which, after hydrolysis, do not affect the acidity level in the system according to the invention. The mixed anhydrides or esters with corresponding compounds of boron and/or silicon described hereinafter are particularly suitable in this regard.

The velocity of the reaction can be influenced through the hydrolysis stability of the masked carboxylic acid compound used. This opens up possibilities of influencing the reaction to enable the course of polymerization to be adapted to the particular application envisaged. This is explained purely by way of example in the following. A masked carboxylic acid compound in the context of the invention is acetic anhydride. However, acceleration of the reaction during initiation of polymerization by molecular oxygen, more especially by contact with air, is only brought about by free acetic acid after adequate hydrolysis. This hydrolysis of the anhydride in situ in the reaction mixture at room temperature under the effect of air with its limited moisture content can be a comparatively laborious process. On the one hand, the open time of the reactive system is lengthened in this way, on the other hand setting of the reactive system can be unreasonably delayed in individual cases. If comparatively more hydrolysis-labile compounds, for example of the type described hereinafter, are used instead, the system as a whole is effectively activated in only comparatively short times. Taking this consideration into account, the following meanings in particular may be attributed to the radical X in general formula II:

radicals corresponding to general formula III $$R_5-CO- \quad (III)$$

in which $R_5$ may be the same as or different from $R_4$ in general formula II and, in particular, represents alkyl, cycloalkyl or aryl; all these radicals may also be substituted, with the proviso that the free carboxylic acid $R_5COOH$ formed during hydrolysis corresponds at least to the above-mentioned lower limit to the $pK_a$ value.

Mixed anhydrides or esters with boron compounds containing hydroxyl groups are suitable as comparatively hydrolysis-labile components. In this class of compounds, the radical X in general formula II preferably corresponds to the radical of general formula IV below:

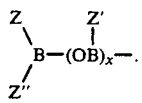

(IV)

In that part of the molecule which corresponds to general formula IV above, the Z's may be the same or different and, in particular, represent a radical $R_5-CO-O-$ and/or alkyl, cycloalkyl and/or aryl radicals which in turn may optionally be substituted and/or attached to the boron by an oxygen atom. $R_5$ has the meaning already defined in connection with general formula III. x is 0 or an integer and, in particular, has a value of 0 to 2. A particularly important masked, weak carboxylic acid for use in accordance with the invention is derived from compounds corresponding to general formula II, in which X is a radical corresponding to general formula IV where x is the number 1 and the Z's represent $R_4-CO-O-$. A typical representative of this class of compounds is tetraacetoxy diboroxane which has proved to be a particularly effective carboxylic acid compound and which is easy to prepare and to mask in readily stabilized form, but can be rapidly hydrolyzed on contact with ambient air.

Another particularly suitable class of these masked carboxylic acid compounds is derived from analogous compounds of silicon in the radical X. Compounds of this type also correspond to general formula I although, in their case, X has the meaning defined by general formula V below:

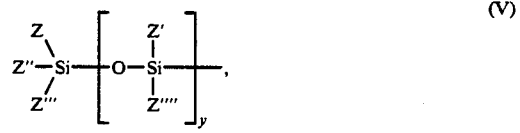

where Z can have the same meaning as in formula IV and y preferably has a value of from about 0 to 10 and, more preferably, a value of 0 to about 5. For preparative reasons, it may be advisable for the radicals Z in compounds of this type to be formed by hydrocarbon radicals and, in particular, by alkyl radicals, more especially lower alkyl radicals, such as methyl. In one preferred embodiment, at least two alkyl radicals, particularly methyl radicals, are present in that part of the molecule which corresponds t general formula V at at least some silicon atoms and preferably at all the silicon atoms. Components of this type are particularly easy to prepare so that the associated masked compounds of general formula II are particularly easy to obtain.

Certain integral components may be present as compounds of general formula II, in which X corresponds to general formula IV or V in regard to the indices x and y, as already explained in regard to the case of tetraacetoxy diboroxane. However, it is also possible to use homologous mixtures in regard to the radicals IV and particularly in regard to the radical V, so that x and, in particular, y as average values do not have to correspond to integral values.

Activator systems of the three principal components described in the foregoing, namely aromatic amine compound, at least partly soluble metallic drier, and masked weak acid capable of hydrolysis, are able after taking up moisture and oxygen from the ambient air to initiate all the radically polymerizable, olefinically unsaturated systems which, hitherto, have been used with a variety of different, particularly peroxidic, starter systems. To this extent, the other constituents of the radically polymerizable, moldable multicomponent mixtures according to the invention may be as defined in the extensive relevant literature which is concerned with the production and processing of systems based on olefinically unsaturated radically polymerizable compounds. A very large number of systems of this type tailored in their properties to the particular application envisaged are currently available to one skilled in the art. Basically, the principle according to the invention of initiating reactions by contact with oxygen and particularly by mere contact with ambient air may be applied anywhere where there is no possibility of troublesome interaction with the above-described principal components of the activator used in accordance with the invention. General chemical knowledge in conjunction with the above-described principles of the teaching according to the invention will be sufficient to determine the extent to which specially selected systems can be used or how they have to be used in the context of the invention to meet the requirements of the teaching according to the invention. This is illustrated by the following example:

Polymerizable components and, optionally, soluble and/or insoluble fillers and also the mixtures containing activator systems according to the invention may be formulated as a one-component system which is non-reactive in the absence of air providing measures are taken to ensure that the mixture does not contain any constituents which lead to the unwanted premature reaction of at least one of the principal components of the system according to the invention. Thus, for the formulation of one-component systems, it is particularly important that the systems as a whole are free from reactive groups, particularly in the form of reactive hydrogen atoms, as present for example in the form of hydroxyl and/or carboxyl groups. Reactive groups such as these containing active hydrogen atoms are always troublesome when they lead to premature release of the masked, weakly acidic carboxylic acids.

However, the presence of reactive groups such as these in no way makes it impossible to use the starter systems according to the invention. For example, this affords the possibility of using the multicomponent system. If, for example, components containing active hydrogen atoms, for example in the form of free carboxyl and/or hydroxyl groups, are to be used in the system as a whole, the multicomponent mixture to be used in accordance with the invention may be formulated as a multicomponent system in this embodiment. In this case, it is important to ensure that the components containing reactive hydrogen atoms are kept separate from the masked, weak carboxylic acids of the activator system according to the invention in the multicomponent system. For the practical application of the system, the components are mixed with one another in known manner. The open pot life of the system may be regulated by suitable choice and adaptation of the principal components of the activator system, so that the starting reaction can again be initiated and, hence, the system ultimately hardened by contact with ambient air. This purely exemplary explanation of using components containing reactive hydrogen atoms also applies to other reactive components. Providing the activator system remains functional even after all the components of the multicomponent mixture have been mixed together, its suitability for use under the described conditions is guaranteed.

Another way of removing potentially reactive and hence troublesome groups from the reaction is to mask them. This principle, which applies to another preferred embodiment of the invention, is illustrated with reference to the example of unwanted free carboxyl groups. By temporary masking with, for example, groups unstable to hydrolysis, it is possible to ensure that no unwanted secondary reactions are initiated during storage in the absence of moisture. However, the masking of such free carboxyl groups can be removed again at a later stage by the action of moisture which is required in any event for initiating reactions. However, it is possible in this regard to regulate the stability of the masked form through the degree of instability to hydrolysis. General chemical principles apply in this regard. This principle of the hydrolysis-labile masking of free carboxyl groups may also be applied in particular in the following combination: important olefinically unsaturated and radically polymerizable acids, such as (meth-)acrylic acid(s), crotonic acid, maleic acid, and the like, may be added to the reaction mixture and hence to the reaction in such masked form. If the masking of these acid components is more stable to hydrolysis than the masked carboxylic acid component—added to initiate reactions—of the activator system used in accordance with the invention, the unsaturated carboxylic acids will initially be included in the polymerization process in masked form. The masking may be eliminated by hydrolysis at a later stage. However, it is clear that it is also possible in accordance with the invention at least partly to use unsaturated carboxylic acids such as these in masked, but hydrolysis-labile form as a weakly acidic catalyst component. In this case, a dual reaction-initiating function is performed, for example, by the acrylic or methacrylic acid in the reaction mixture. After adequate hydrolytic elimination of the masking, the free acid formed has a reaction-initiating effect in cooperation with the other components of the activator systems according to the invention, but at the same time is included in the polymerization process and bound into the polymer molecule formed.

In one particular embodiment, the invention relates to multicomponent systems which are non-reactive, even on contact with air, and only initiate the starting reaction required in accordance with the invention after all the components have been mixed. This embodiment is based in particular on the division of the activator system into a two-component system. In the preferred embodiment, the tert-N-compound is kept separate from the metal compounds and the compounds hydrolyzable to free carboxylic acids. However, both components of the system as a whole may contain substantial proportions of the compounds to be polymerized and/or the other fillers and auxiliaries to be used. In this case, it is possible in particular to distribute the quantities of the principal components of the multicomponent mixture between the two components in such a way that both individual components make up substantial proportions of the mixture as a whole. In this way, it is possible during dispensing and mixing to form the ready-to-use mixture to avoid the difficulties which can occur for example when a component kept separate in only a very small quantity is to be quickly and reliably distributed in a very large quantity of a second component.

In the preferred embodiment, the multicomponent mixtures according to the invention, which contain both the activator system according to the invention and the components to be polymerized in admixture with their fillers and/or auxiliaries, are formulated as a free-flowing, but at least slightly thickened t paste-like and spreadable multicomponent mixture. The particular consistency intended is adapted to the application envisaged. Adhesives and filling or sealing compounds will generally be given a more paste-like consistency than spreadable or sprayable paints. In one preferred embodiment, the systems are free from solvents. Their flow properties are generally adjusted or regulated by ethylenically unsaturated monomers. At the present time, the monomers predominantly used in the field of radically initiated polymerization are based on acrylate and/or methacrylate compounds, styrene or substituted styrenes and/or acrylonitrile. The activator systems according to the invention are effective initiators for monomers of this type, particularly in the systems typically used at present, and may be formulated in particular as initiators reacting on contact with ambient air at room temperature or only slightly elevated temperatures. The initiation of polymerization reactions in accordance with the invention may be applied to the entire range of known (meth)acrylate systems and styrene-modified mixtures and particularly to systems based on unsaturated polyester resins/styrene.

It has been found that polymerization reactions can be rapidly and effectively initiated at the time determined in advance for the particular system in question when the systems used have at least slightly elevated viscosity values. Thus, the initiation of polymerization above all in the pure unsaturated monomer stabilized in the usual way, for example in commercially available pure (meth)acrylate, styrene and the like can present difficulties. However, if these components are even only slightly thickened, polymerization can be initiated without difficulty by contact with ambient air. The minimum viscosity of the systems to be hardened in accordance with the invention in the in-use state is at least about 30 to 100 mPas (Brookfield). It may be appropriate to work with slightly higher viscosities in the original processing state so that preferred limits are at about 200 mPa.s and, more particularly, at at least about 300 mPa.s. Materials with viscosities of at least about 500 are often of particular practical significance; this applies not only to adhesives and sealing compounds with viscosities above about 3000 mPa.s and, more particularly, of up to about 10,000 mPa.s, but also to mixtures intended for surface coating, particularly solventless paint systems. In cases of practical relevance, there is generally no need to regulate the minimum viscosity. Only in the special case of highly mobile liquid phases, as formed for example by the unsaturated monomers mentioned above, need appropriate auxiliary measures be considered for slightly thickening the system.

The possibility of formulating one-component systems which are non-reactive in the absence of air and which react under time control on contact with air enables the scope of potential technical applications to be considerably extended. This is illustrated by the following example:

Ready-to-use one-component adhesives based for example on methacrylate, which harden simply by contact with air to initiate polymerization, are not known. The only adhesive system which has been formulated for practical application in accordance with this ideal are the cyanoacrylate adhesives which, however, are attended by considerable practical difficulties. The reaction on which the hardening of cyanoacrylate adhesives is based takes place under the influence of moisture by an anionic mechanism; the stability of such one-component materials in storage is always seriously jeopardized. The performance of cyanoacrylates as adhesives is limited by their limited physical properties.

By contrast, the invention provides for the formulation of optimized acrylate- and/or methacrylate-based adhesive mixtures in the form of a non-reactive one-component mixture which is activated and thus tackified by application to the surfaces to be bonded and the accompanying exposure to ambient air and subsequently hardened. Without departing from the principles of the invention, including in particular inert behavior with respect to the main components of the activator system, it is possible to use soluble and/or insoluble fillers, elasticizers, thickeners, thixotropic agents, pigments, coupling agents, stabilizers and the like without endangering the performance of the activator system according to the invention.

One particular feature of the multicomponent mixtures according to the invention or rather the activator systems used therein is that double inhibition and hence double control of the system as a whole is possible. Through the presence of driers, the multicomponent mixture is stabilized against unwanted contact with moisture. The driers are preferably used in predetermined quantities and are homogeneously incorporated in active form in the multicomponent mixture. Their quantity and capacity determine the time beyond which moisture penetrating by diffusion is no longer bound by the drier and leads to hydrolysis and hence release of the masked weak carboxylic acid. On the other hand, the presence of typical selected reducing agents provides for stabilization against unwanted contact with oxygen. In this case, too, it is possible through the particular quantity of reducing agent used to influence the time beyond which the system is activated by oxygen with formation of hydroperoxide. It is clear that, in individual cases, considerable freedom to influence the course of reaction is obtained through this dual control possibility. Thus, it may be desirable for example to achieve full saturation of an applied paint or adhesive film with oxygen without premature barrier formation occurring through early initiation of polymerization at the surface of the reactive material. It may be desirable in this case to delay the starting reaction by delayed hydrolysis of the masked acid using a relatively large quantity of the drying agent. Conversely, however, the concentration of free acid in the exposed film of material may be increased by initially inhibiting the oxidation reaction through the use of a comparatively larger quantity of reducing agent so that, immediately after the start of the oxidation reaction, a relatively large amount of free acid is available for the reaction.

Various mechanisms are available for inhibiting the "autox" system used in accordance with the invention, of which the five basic types 1 to 5 are listed below:

1. stabilization against $O_2$, addition of antioxidants
2. stabilization against $H_2O$, addition of drying agent
3. stabilization against R—OOH, addition of reducing agent
4. stabilization against radicals, addition of radical inhibitors
5. stabilization against premature acid formation ($H^+$), addition of bases From general knowledge of chemistry, typical stabilizer components are listed in the following, the numbers in parentheses after the particular compound indicating which of the five mechanisms listed above is to be assigned to the stabilizer:

pyrogallol (1), $O_2$-inhibited acrylates (1), hydroquinone (1,4), hydroquinone monomethyl ether (1,4), substantially dehydrated zeolites, particularly zeolite A of low water content (2), metal salts binding water of crystallization, for example anhydrous copper sulfate (2), triphenyl phosphine (3), tributyl phosphite (3), butyl hydroxytoluene (4), phenothiazine (4), anhydrous basic oxide compounds, such as $Al_2O_3$ basic and/or CaO (5), dicyclohexyl carbodiimide (2).

In the multicomponent mixtures according to the invention, the activator mixtures preferably make up no more than about 25% by weight and, in particular, no more than about 10% by weight, based on the weight of the system as a whole. Depending on the activity of the components used, the weight of the activator mixture can be greatly reduced, for example to about 0.1% by weight or to at least about 0.5% by weight. Particularly suitable quantities of the activator system are at least about 1% by weight, preferably up to about 8% by weight and more preferably from about 1 to 7% by weight. All these figures are based on the one hand on the total weight of the multicomponent system according to the invention and the total weight of the three principal components of the activator system.

The three principal components of the activator system may advantageously be used in the following quantitative ratios to one another (in % by weight, based on the mixture of the three activator constituents):

0.5 to 20% and preferably 5 to 15% of the metal compound 30 to 60% and preferably 40 to 55% of the tertiary amine compound 30 to 60% and preferably 40 to 55% of the masked weak acid.

The particular quantities in which the metal compounds are used may also be defined in particular through the ratio by weight of the weight of the metal to the weight of the multicomponent activator system as follows:

Preferred quantities of metal compound are from 0.01 to 5% by weight, preferably from 0.05 to 2% by weight and more preferably from about 0.1 to 1% by weight metal, based on the total weight of the activator constituents.

If inhibitors and/or stabilizers of the type mentioned above are used to control the course of the reaction and/or the open pot life, the quantities in which they are used will be gauged according to the stated purpose. In each individual case, they may readily be determined by considerations appropriate to the person of ordinary skill in the art and/or by preliminary tests. This is also illustrated purely by way of example in the form of a comparison: where a metal salt forming water of crystallization, for example copper sulfate, is used for the primary binding of moisture penetrating by diffusion, it will have to be used in larger quantities—purely in terms of weight—than in the case where triphenyl phosphine is used in the corresponding inhibition of diffusing oxygen. The regulators used will normally not exceed a few percent, for example about 2 to 5% by weight, of the mixture as a whole and are generally used in quantities of less than 1% by weight.

In another embodiment, the present invention relates to the activator systems—described in detail at the beginning—of the three components tertiary amine compound, at least partly soluble metal component and hydrolyzable masked compound of the weak acid with $pK_a$ values of the free acid of no less than about 0.9. All numerical and factual data on the definition of these components also apply in the same way to this embodiment of the invention.

The invention also relates to the use of the activator systems for initiating reactions of radically polymerizable systems containing ethylenically unsaturated components by contact with oxygen and water and more especially by contact with ambient air, preferably at room temperature or only slightly elevated temperature. More particularly, the invention relates in this regard to the use of activator systems in acrylate- and/or methacrylate-based polymerizable materials or mixtures or comparable systems based on compositions containing styrene and/or acrylonitrile, for example mixtures of styrene and unsaturated polyester resins.

In one particularly important embodiment, the invention relates to aerobic adhesive systems which may be present in particular in the form of a one-component adhesive packed in storable form and which are characterized by the use of the activator mixtures according to the invention. In further embodiments, the invention relates to the use of these activator systems for surface coating with polymerizable, in particular spreadable coating materials. In a preferred variant of this embodiment, the invention provides spreadable air-drying paint systems which are preferably solvent-free. Finally, in another embodiment, the invention relates to the use of suitable systems, for example the above-mentioned styrene/unsaturated polyester resin systems, for the production of moldings with initiation of the reaction involved by contact with ambient air.

Systems of the above-described type frequently contain combinations of low molecular weight, ethylenically unsaturated monomers and preformed oligomers and/or polymers which are compatible with the monomers used and, in particular, are at least partly soluble therein. The content of radically polymerizable components in such multicomponent mixtures, particularly their monomer content, is at least about 20% by weight and preferably at least about 40% by weight. Taking into account the boundary condition of at least slightly elevated viscosity, monomer contents may reach upper limits of 60, 80 or even 90% by weight. More specifically, the general knowledge of one skilled in the art applies in this regard. Oligomeric or polymeric components added to the multicomponent mixture may in turn contain reactive groups, particularly ethylenically unsaturated groups, or may also be free from such groups. Finally, however, it is known that the need to use low molecular weight monomeric compounds may be virtually eliminated if it is possible to ensure that a mixture consisting solely of preformed oligomeric and/or polymeric compounds at least partly accessible to the radically initiated polymerization or crosslinking reaction can be handled and, in particular, processed by molding.

EXAMPLES

EXAMPLE 1

A mixture of

| | |
|---|---|
| 44.5% | MMA |
| 45% | polyester polyurethane consisting of 2 moles CAPA 200 (a polycaprolactone manufactured by UCC, OH value 209) 3 moles 2,4-tolylene diisocyanate (DESMODUR T 100, a product of Bayer AG) 1 mole B-01/20 (a polypropylene glycol manufactured by Hoechst, OH value 75) 1 mole hydroxyethyl methacrylate |
| 5% | tetraacetoxy diboroxane |
| 5% | N,N-dimethyl-p-toluidine |
| 0.5% | cobalt naphthenate (cobalt content 6%) | hardens in air in 60 minutes in a layer thickness of about 1 to 2 mm. By reducing the layer thickness to the usual film thickness for adhesives, the hardening time is reduced to 20 minutes.

EXAMPLE 2

The adhesive mixture consists of

| | |
|---|---|
| 49.5% by weight | MMA |

-continued

| | |
|---|---|
| 40% by weight | soluble filler (PLEXIGUM MB 319, Röhm) |
| 5% by weight | tetraacetoxy diboroxane |
| 5% by weight | N,N-dimethyl-p-toluidine |
| 0.5% by weight | cobalt naphthenate. |

The multicomponent mixture is prepared from anhydrous components and is stored after degassing in an inert gas atmosphere.

For bonding, the adhesive mixture is applied to the surfaces to be bonded and exposed to the ambient air for 3 to 5 minutes. After the start of the reaction—as reflected in clouding and incipient skin formation—the substrates are bonded and fixed.

After storage for 24 hours at room temperature, material failure occurs in the tensile shear testing of bonded PVC sheets.

EXAMPLES 3 TO 8

Mixtures of

| | |
|---|---|
| 65% | MMA |
| 28% | PLEXIGUM MB 319 |
| 3.5% | N,N-dimethyl-p-toluidine |
| 3.5% | carboxylic acid derivative |
| 0.03% | Co (II) acetyl acetonate and optionally |
| 0–1000 ppm | initiator | harden on contact with ambient air. For bonding, the parts to be bonded are thinly coated, fitted together after 3 to 5 minutes (skin formation) and optionally fixed. Tensile shear strength was determined after 24 hours.

| Example No. | Carboxylic acid derivative | Pot life (mins) | Tensile shear strength (PVC) (N/mm$^2$) |
|---|---|---|---|
| 3 | Tetraacetoxy diboroxane | 60 | 7.9 (MF) |
| 4 | Tetraacetoxy diboroxane addition of 200 ppm triphenyl phosphine | 60 | 6.5 (MF) |
| 5 | Acetic acid trimethyl silyl ester | 150 | 3.0 (MF) |
| 6 | Propionic acid trimethyl silyl ester | 180 | 1 |
| 7 | Tetraacetoxy silane | 15 | 10.5 (MF) |
| 8 | Trimethyl silyl methacrylate | 64 | 1.5 |

MF = material failure

EXAMPLE 9

A mixture of

| | |
|---|---|
| 62% | tetrahydrofurfuryl methacrylate |
| 31% | PLEXIGUM MB 319 |
| 0.03% | Co-acetyl acetonate |
| 3.5% | N,N-dimethyl-p-toluidine |
| 3.5% | tetraacetoxy diboroxane | has a pot life of 60 minutes on contact with ambient air.

Bonding carried out in accordance with Examples 4 to 9 produced tensile shear strengths of 7.5 N/mm$^2$ on PVC and 7.6 N/mm$^2$ on iron.

EXAMPLE 10

A mixture of

| | |
|---|---|
| 63% | MMA |
| 27% | PLEXIGUM MB 319 |
| 3% | Mn (II) octanoate |
| 3.5% | N,N-dimethyl-p-toluidine |
| 3.5% | tetraacetoxy diboroxane | polymerizes 15 minutes after contact with the atmosphere.

EXAMPLE 11

An activator system of 5% by weight dimethyl-p-toluidine, 5% by weight tetraacetoxy diboroxane, and 0.5% by weight cobalt naphthenate solution is added in a quantity of 89.5% by weight to the commercial product "DIACRYL 101" (dimethacrylate of bisphenol A×2 EO) in the absence of further reactive monomer components.

After exposure of this mixture to air, the material polymerizes in one hour (surface tackiness) and hardens in one day.

Similar behavior is observed where cyclohexyl methacrylate is used.

What is claimed is:

1. Moldable, radically polymerizable multi-component mixtures comprising:
    ethylenically unsaturated, polymerizable components, and
    an activator system initiatable by contact with air, wherein the improvement comprises the presence in this mixture of an activator system that can be initiated by contact with oxygen and water and that consists essentially of:
    N-alkyl-substituted tert-arylamines corresponding to general formula I

in which R$_1$ is an unsubstituted or substituted aryl radical, R$_2$ is an unsubstituted or substituted aryl radical or an unsubstituted or substituted, linear, or branched alkyl radical, and R$_3$ is a substituted or unsubstituted linear or branched alkyl radical which has at least one H atom in the α-position to the N;
    metal compounds that are soluble to the extent of 0.01 parts by weight of metal compound in a test mixture consisting of 40 parts by weight of toluene, 10 parts by weight of triethylene glycol dimethacrylate, 2 parts by weight of methacrylic acid, and 2 parts by weight of N,N-dimethyl-4-toluidine and when admixed with said text mixture to the extent of 0.01 parts by weight of metal compound cause the test mixture to gel within two hours after admixing the metal compound into the test mixture; and
    molecules that contain no carboxylic acid group as such, but that can react with water to produce molecules of carboxylic acid having a pK$_a$ value of at least 0.9.

2. Multicomponent mixtures as claimed in claim 1, that are activated on contact with ambient air at ambient temperature.

3. Multicomponent mixtures as claimed in claim 2, wherein the N-alkyl-substituted tert-arylamines are selected from the group consisting of dialkyl aniline compounds substituted or unsubstituted in the ring, of which the alkyl radicals each contain no more than 6 C atoms.

4. Multicomponent mixtures as claimed in claim 1, wherein the metal compounds in the activator system are selected from the group consisting of compounds of cobalt, manganese, and iron.

5. Multicomponent mixtures as claimed in claim 1, wherein said molecules that contain no carboxylic acid group as such, but that can react with water to produce molecules of carboxylic acid hydrolyze to acids having $pK_a$ values no lower than about 1.3 and no higher than about 7.

6. Multicomponent mixtures as claimed in claim 1, wherein the molecules that contain no carboxylic acid group as such, but that can react with water to produce molecules of carboxylic acid are anhydrides, mixed anhydrides with other masked weak carboxylic acids, or mixed anhydrides or esters with hydroxy compounds of boron or silicon.

7. Multicomponent mixtures as claimed in claim 1, comprising ethylenically unsaturated polymerizable components selected from the group consisting of acrylate and methacrylate compounds, styrene and substituted styrenes, acrylonitrile, and oligomers thereof.

8. Multicomponent mixtures as claimed in claim 1, wherein the activator mixtures makes up about 1 to 8% by weight of the system as a whole.

9. Multicomponent mixtures as claimed in claim 1, comprising the components of the activator system in the following percentages by weight, based on the mixture of the three constituents of the activator:
0.01 to 5% stoichiometric equivalent of metal in the metal compound;
30 to 60% of tert-amine compound; and
30 to 60% of the molecules that contain no carboxylic acid group as such, but that can react with water to produce molecules of carboxylic acid having a $pK_a$ value of at least 0.9.

10. Multicomponent mixtures as claimed in claim 1, wherein the content of ethylenically unsaturated components is at least about 20% by weight.

11. Multicomponent mixtures as claimed in claim 1, having a viscosity of at least about 100 mPas.

12. A multi-part adhesive system, comprising:
(I) a first part composition consisting essentially of:
(A1) a polymerizable mixture of ethylenically unsaturated molecules; and
(B1) a latent polymerization initiator component that consists essentially of one or two of the following three subcomponents:
(1) N-alkyl-substituted tertiary arylamine molecules containing at least one aliphatic N—C—H bond;
(2) molecules of metal compounds that are soluble to the extent of 0.01 parts by weight of metal compound in a test mixture consisting of 40 parts by weight of toluene, 10 parts by weight of triethylene glycol dimethylacrylate, 2 parts by weight of methacrylic acid, and 2 parts by weight of N,N-dimethyl-4-toluidine and when admixed with said test mixture to the extent of 0.01 parts by weight of metal compound cause the test mixture to gel within two hours after admixing the metal compound into the test mixture; and
(3) molecules that contain no carboxylic acid group as such but that can react with water to produce molecules of carboxylic acid having a $pK_a$ value of at least 0.9;
and, optionally,
(C1) mechanical property modifiers for the polymer formed by polymerization of component (A1);
(D1) coloring and/or opacifying agents; and
(E1) inhibitors of premature polymerization initiation; and
(II) a second part composition consisting essentially of:
(A2) a latent polymerization initiator component that consists essentially of one or two of the following three subcomponents that is not present in component (B1) of said first part composition:
(1) N-alkyl-substituted (tertiary arylamine molecules containing at least one aliphatic N—C—H bond;
(2) molecules of metal compounds that are soluble to the extent of 0.01 parts by weight of metal compound in a test mixture consisting of 40 parts by weight of toluene, 10 parts by weight of triethylene glycol dimethacrylate, 2 parts by weight of methacrylic acid, and 2 parts by weight of N,N-dimethyl-4-toluidine and when admixed with said test mixture to the extent of 0.01 parts by weight of metal compound cause the test mixture to gel within two hours after admixing the metal compound into the test mixture; and
(3) molecules that contain no carboxylic acid group as such but that can react with water to produce molecules of carboxylic acid having a $pK_a$ value of at least 0.9;
and, optionally,
(B2) a polymerizable mixture of ethylenically unsaturated molecules;
(C2) mechanical property modifiers for the polymer formed by polymerization of a mixture of components (A1) and (B2), if any of the latter are present;
(D2) coloring and/or opacifying agents; and
(E2) inhibitors of premature polymerization initiation; and, if not all of the alternative subcomponents of item (B1) or (A2) are present in said first and said second part compositions,
(III) a third part composition containing the subcomponent not present in either the first or the second part compositions.

13. A multi-part adhesive system according to claim 12, consisting of only two parts, one of which contains both molecules of metal compounds that are soluble to the extent of 0.01 parts by weight of metal compound in a test mixture consisting of 40 parts by weight of toluene, 10 parts by weight of triethylene glycol dimethacrylate, 2 parts by weight of methacrylic acid, and 2 parts by weight of N,N-dimethyl-4-toluidine and when admixed with said test mixture to the extent of 0.01 parts by weight of metal compound cause the test mixture to gel within two hours after admixing the metal compound into the test mixture and molecules that contain no carboxylic acid group as such but that react with water to produce molecules of carboxylic acid having a $pK_a$ value of at least 0.9.

14. A multi-part adhesive system according to claim 12, wherein the N-alkyl-substituted tert-arylamines are selected from the group consisting of dialkyl aniline compounds substituted or unsubstituted in the ring, of which the alkyl radicals each contain no more than 6 C atoms.

15. A multi-part adhesive system according to claim 12, wherein the molecules of metal compounds are selected from compounds of cobalt, manganese, and iron.

16. An initiator for the polymerization of molecules containing ethylenic unsaturation, comprising:
    (1) N-alkyl-substituted tertiary arylamine molecules containing at least one aliphatic N—C—H bond;
    (2) molecules of metal compounds that are soluble to the extent of 0.01 parts by weight of metal compound in a test mixture consisting of 40 parts by weight of toluene, 10 parts by weight of triethylene glycol dimethacrylate, 2 parts by weight of methacrylic acid, and 2 parts by weight of N,N-dimethyl-4-toluidine and when admixed with the test mixture to the extent of 0.01 parts by weight of metal compound cause the test mixture to gel within two hours after admixing the metal compound into the test mixture; and
    (3) molecules that contain no carboxylic acid group as such but that can react with water to produce molecules of carboxylic acid having a $pK_a$ value of at least 0.9.

17. A process comprising mixing with material containing ethylenic unsaturation an initiator comprising:
    (1) N-alkyl-substituted tertiary arylamine molecules containing at least one aliphatic N—C—H bond;
    (2) molecules of metal compounds that are soluble to the extent of 0.01 parts by weight of metal compound in a test mixture consisting of 40 parts by weight of toluene, 10 parts by weight of triethylene glycol dimethacrylate, 2 parts by weight of methacrylic acid, and 2 parts by weight of N,N-dimethyl-4-toluidine and when admixed with said text mixture to the extent of 0.01 parts by weight of metal compound cause the test mixture to gel within two hours after admixing the metal compound into the test mixture; and
    (3) molecules that contain no carboxylic acid group as such but that can react with water to produce molecules of carboxylic acid having a $pK_a$ value of at least 0.9;
and exposing the mixture thus formed to ambient air until the mixture solidifies.

18. A process for bonding two objects, comprising steps of:
    (A) applying to the surface to be bonded of at least one of the objects of an adhesive composition comprising:
        (1) ethylenically unsaturated, polymerizable compounds and
        (2) an activator system that is initiatable by contact with ambient air and that consists essentially of:
            (i) N-alkyl-substituted tert-arylamines corresponding to general formula I

in which $R_1$ is an unsubstituted or substituted aryl radical, $R_2$ is an unsubstituted or substituted aryl radical or an unsubstituted or substituted, linear, or branched alkyl radical, and $R_3$ is a substituted or unsubstituted linear or branched alkyl radical which has at least one H atom in the $\alpha$-position to the N;
            (ii) metal compounds that are that are soluble to the extent of 0.01 parts by weight of metal compound in a test mixture consisting of 40 parts by weight of toluene, 10 parts by weight of triethylene glycol dimethacrylate, 2 parts by weight of methacrylic acid, and 2 parts by weight of N,N-dimethyl-4-toluidine and when admixed with said text mixture to the extent of 0.01 parts by weight of metal compound cause the test mixture to gel within two hours after admixing the metal compound into the test mixture; and
            (iii) molecules that contain no carboxylic acid group as such but that can react with water to produce molecules of carboxylic acid having a $pK_a$ value of at least 0.9;
    (B) exposing the adhesive coated surface of the object prepared in step (A) to ambient air for a time effective to initiate polymerization of the coated adhesive; and
    (C) contacting the initiated adhesive coated surface prepared in step (B) with the surface of the other object to be bonded and maintaining these two objects in contact until an adhesive bond forms between them.

19. A process for surface coating an object, said process comprising steps of:
    (A) applying to the surface of said object a fluid mixture comprising:
        (1) ethylenically unsaturated, polymerizable compounds and
        (2) an activator system that is initiatable by contact with ambient air and that consists essentially of:
            (i) N-alkyl-substituted tert-arylamines corresponding to general formula I

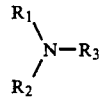

in which $R_1$ is an unsubstituted or substituted aryl radical, $R_2$ is an unsubstituted or substituted aryl radical or an unsubstituted or substituted, linear or branched alkyl radical, and $R_3$ is a substituted or unsubstituted linear or branched alkyl radical which has at least one H atom in the $\alpha$-position to the N;
            (ii) metal compounds that are that are soluble to the extent of 0.01 parts by weight of metal compound in a test mixture consisting of 40 parts by weight of toluene, 10 parts by weight of triethylene glycol dimethacrylate, 2 parts by weight of methacrylic acid, and 2 parts by weight of N,N-dimethyl-4-toluidine and when admixed with said test mixture to the extent of 0.01 parts by weight of metal compound cause the test mixture to gel within two hours after admixing the metal compound into the test mixture; and (iii) molecules that contain no carboxylic acid group as such but that can react with water to produce molecules of carboxylic acid having a $pK_a$ value of at least 0.9;

(B) exposing the object coated in step (A) to ambient air for a sufficient time to cause the fluid composition thereon to be converted to a solid coating.

20. A process for producing a solid object, comprising steps of shaping into the desired shape for the object a fluid mixture comprising:

(1) ethylenically unsaturated, polymerizable compounds and (2) an activator system that is initiatable by contact with ambient air and that consists essentially of:

(i) N-alkyl-substituted tert-arylamines corresponding to general formula I

in which $R_1$ is an unsubstituted or substituted aryl radical, $R_2$ is an unsubstituted or substituted aryl radical or an unsubstituted or substituted, linear, or branched alkyl radical, and $R_3$ is a substituted or unsubstituted linear or branched alkyl radical which has at least one H atom in the α-position to the N;

(ii) metal compounds that are soluble to the extent of 0.01 parts by weight of metal compound in a test mixture consisting of 40 parts by weight of toluene, 10 parts by weight of triethylene glycol dimethacrylate, 2 parts by weight of methacrylic acid, and 2 parts by weight of N,N-dimethyl-4-toluidine and when admixed with said text mixture to the extent of 0.01 parts by weight of metal compound cause the test mixture to gel within two hours after admixing the metal compound into the test mixture; and (iii) molecules that contain no carboxylic acid group as such but that can react with water to produce molecules of carboxylic acid having a $pK_a$ value of at least 0.9;

exposing the shaped mass thus formed to ambient air until the shaped mass hardens into a solid.

* * * * *